Patented Sept. 28, 1943

2,330,291

UNITED STATES PATENT OFFICE 2,330,291

DYE INTERMEDIATE

James Emory Kirby, Wilmington, Del., assignor to E. I. du Pont de Nemours & Company, Wilmington, Del., a corporation of Delaware No Drawing. Application October 24, 1939, Serial No. 301,041

12 Claims. (Cl. 260—562)

This invention relates to new dye coupling intermediates and more particularly to new dye coupling intermediates for use in azo dye manufacture and color photography, and still more particularly to new dye intermediates which are fast to washing and are non-leachable from and non-migratory in photographic emulsion layers.

The process of developing an exposed silver salt image in a dye-forming developer has been known for many years. Fischer in U. S. Patent 1,102,028 describes a method for producing color pictures by using a "color former," i. e., phenol or an active methylene compound in conjunction with p-phenylenediamine or dialkyl p-phenylenediamine developer to yield a dye image. The color former is placed either in the developing solution or in the photographic emulsion layer itself. This procedure is capable of producing colors of great brilliance and fidelity to nature but as applied to modern tricolor photography suffers difficulties as mentioned in more detail below. Fischer in U. S. 1,055,155 discloses a multilayer film, each layer sensitized to register approximately one third of the range of the visible spectrum, and each layer containing a suitable color former. This simple process has the disadvantage that color formers previously available have tended to migrate from one layer to the next or to various areas in the layer thus producing color confusion. This has led to endeavors to obtain non-migratory color formers for use in multilayer color films.

This invention has as its object the production of new dye-forming intermediates, hereinafter termed "coupling components" or "color formers," which yield azo dyes when coupled with diazotized aromatic amines or indophenol, indoaniline, indamine, or azomethine dyes when coupled with aromatic nitroso compounds or the oxidation products of aromatic amino photographic developers. A further object is to produce coupling components which are characterized by superior resistance to removal from or migration in or between photographic emulsion layers during manufacture, storage, and processing. A still further object is to provide a method for obtaining non-migratory coupling components capable of being converted to dyes having a wide range of colors and to produce colored fabrics, materials, or photographs by employing dyes or pigments made from these coupling components or by developing dyes in fabrics or films containing these coupling components by the methods known in dye chemistry and color photography. Other objects will appear hereinafter.

These objects are accomplished by the following invention which comprises organic compounds containing at least two dye-forming or dye-coupling nuclei connected by a wholly aliphatic chain containing a plurality of amide groups and, within the chain, apart from the terminal groups, at least one amide group and derived from bifunctional aliphatic compounds in which the functional groups are capable of amide formation. The amide groups are, in a preferred modification, separated by at least two hydrogen-bearing carbon atoms.

In the compounds of the present invention, at least two dye-forming or dye-coupling nuclei are connected by means of a polyamide chain above described by methods set forth in detail below. The dye-forming or dye-coupling nuclei which are thus linked are generally, although not necessarily always, aromatic in nature and possess a structure which allows the nucleus to be "coupled" as this term is used in dye chemistry to another dye-forming component to form a dye. The dye thus formed represents a phase of the present invention.

Any dye-forming nucleus, i. e., any nucleus capable of coupling, i. e., condensing with a further component to give a dye according to methods known to the dye chemist, may be thus linked through the polyamide connectors of the present invention. This imposes certain requirements upon the dye-forming nucleus. Inasmuch as it is to be linked to the polyamide connector it must be contained in a monovalent organic, usually aromatic, radical which is attached to the polyamide connector. Since it is to be capable of coupling, it must have certain characteristics of structure and substitution.

Thus the dye-forming nucleus must have a basic nitrogen or oxy oxygen substituent ortho or para on an aromatic ring to a hydrogen or readily replaceable group such as a halogen, sulfonic acid, or carboxyl group, or it must have an active methylene group so that it can be coupled with an aromatic diazonium salt or condensed with a nitroso compound or the oxidation product of a photographic color developer, or it must have a free aromatic primary amino group capable of diazotization, or oxidation and coupling.

The terminal dye coupling nuclei thus possess a structure suitable for the production of one or more of the following types of dyes: azo, indophenol, indoaniline, indamine, or azomethine and may be substituted in various ways well known to dye chemists to effect this result. The preferred compounds of this invention will all couple with diazotized aromatic or heterocyclic amines of the type used in preparing the well known azo dyes or they will couple with the oxidation products of photographic developers of the p-phenylenediamine and p-aminophenol class.

If, however, the terminal groups are chosen so that the final product contains free amine groups, the compound may be diazotized and used as an azo component in the production of dyes. Such amine groups may be formed by reduction of a nitro group, azo group, or by any other suitable method.

In addition to the substituents necessarily present in order that the nucleus couple or condense, e. g., hydrogen or an easily replaceable group ortho or para to oxy oxygen or amino nitrogen, on an aromatic ring, there may be other substituents such as halogen atoms, alkyl, aryl, alkoxy, aralkyl, nitro, carboxylic, or sulfonic acid groups as long as a coupling position is available for azo or nitroso coupling reactions.

In general, it may be stated that the coupling or condensing nuclei are such that with a suitable second coupling or condensing component, they will produce an azo, indophenol, indoaniline, indamine or azomethine dye.

The dye-forming radicals are linked together by means of a bivalent polyamide chain as above defined. Oxoamide chains, i. e., chains containing —CONH— or —SO₂NH— groups are preferred to thioamide —CS—NH— groups. Carbonamide chains, i. e., chains containing —CONH— groups represent the greatly preferred embodiment of the invention.

The types of polyamide chain and the various ways whereby these chains are formed and connected with the dye-forming nuclei, are given in greater detail below.

The more detailed practice of the invention is illustrated by the following examples, wherein parts given are by weight. There are of course many forms of the invention other than these specific embodiments.

*Example I*

A mixture of 3480 parts of dimethyl adipate and 116 parts of hexamethylenediamine is heated to 220° C. for two hours under an atmosphere of nitrogen. The methyl alcohol is then removed under reduced pressure during two hours at the same temperature and the mixture allowed to cool. The product crystallizes in the mixture and has the following structure:

CH₃OOC(CH₂)₄CONH(CH₂)₆NHCO(CH₂)₄COOCH₃

This product is purified by recrystallization from ethyl acetate to give a white crystalline solid melting at 129–132° C. Calculated for C₂₀H₃₆O₆N₂:N=7.00%. Found:N=6.92%

A polyamide-diester identical with the above is prepared by adding 36 parts of the chloride of monomethyl adipate over a period of two hours to a stirred mixture of 12 parts of hexamethylenediamine and 24 parts of pyridine in 100 parts of dioxane held at 0° C. The purified reaction product is obtained by pouring the reaction mixture into 500 parts of ice water, filtering, and recrystallizing from ethyl acetate. The diester may be readily hydrolyzed to the diacid in alcoholic sodium hydroxide. The diacid is a white crystalline solid melting at 170–172° C.; neutral equivalent calculated:171; found:170.

A mixture of 40 parts of the diester and 21.8 parts of o-amino-phenol is melted together and heated to 220° C. for ½ hour. The mixture is cooled, dissolved in alcohol, and added to cold dilute hydrochloric acid. The precipitate is removed and the treatment repeated. The product is then recrystallized several times from alcohol to give a light-tan solid melting at 172–185° C. Calculated for C₃₀H₄₂N₄O₆:N, 10.1%. Found:N, 10.8%.

The product has the following structure:

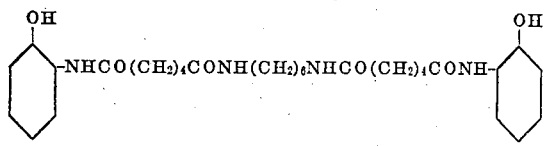

The same product is obtained when 37.2 parts of the diacid is used in place of the diester. This compound is identical with that of Example III and isomeric with the compound of Example IV.

*Example II*

A solution containing 4 parts of diazotized p-nitroanilinesulfonic acid in 100 parts of water is added to a solution of 5.5 parts of the coupling component of Example I in 100 parts of 5% sodium hydroxide at 25° C. After one-half hour, the solution is acidified and salted with sodium chloride. The yellow dye which separates is soluble in alkaline solutions and may be used to dye fabrics such as cotton and wool in shades fast to washing and fulling. It has the following probable structure:

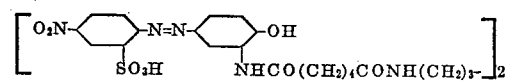

*Example III*

Twenty-six and five tenths parts of methyl N-ortho-hydroxyphenyladipamate (prepared as in Hanford, Kirby and Woodward, copending application, Serial No. 301,070 of even date) and 5.8 parts of hexamethylenediamine are heated together at 210° C. for ½ hour. The compound is purified by several crystallizations from alcohol. This product is identical with that prepared by the process of Example I.

*Example IV*

Twenty-six and five tenths parts of methyl N-meta-hydroxyphenyladipamate (prepared as in Hanford, Kirby and Woodward, copending application Serial No. 301,070 of even date) and 5.8 parts of hexamethylenediamine are heated and stirred together at 210° C. for ½ hour. The product is purified by several crystallizations from alcohol. It is a white crystalline solid, melting at 168–180° C. and is soluble in sodium hydroxide solution. Calculated for C₃₀H₄₂N₄O₆: N, 10.10%; Found: N, 10.15%; 10.04%. This compound has the following structure:

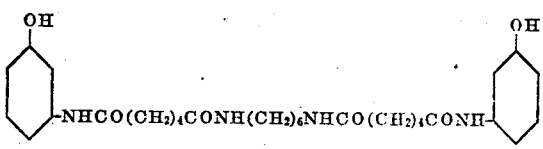

*Example V*

Five and five-tenths parts of the products described in Example IV is dissolved in 200 parts of water containing 0.8 part of sodium hydroxide. This solution is added to 250 parts of a photographic gelatino-silver halide emulsion containing 12 parts per hundred of solids. The emulsion is coated on a cellulose acetate film base, exposed, and developed in a p-amino-diethylaniline developer. After removal of the silver and silver salts a deep-blue dye image remains. This dye is formed by coupling of the color former with the oxidation products of the developer and has the following probable structure:

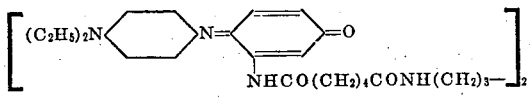

*Example VI*

A water solution containing 5 parts of diazotized 1-naphthylamine-2,8-disulfonic acid is added to a solution of 5.5 parts of the coupling component described in Example IV dissolved in 100 parts of 5% sodium hydroxide solution and warmed to 40° C. for ½ hour. The solution is cooled, acidified, and salted with sodium chloride. The yellow dye obtained is soluble in boiling water and dyes wool a bright orange-yellow which is fast to washing and fulling. It has the following probable structure:

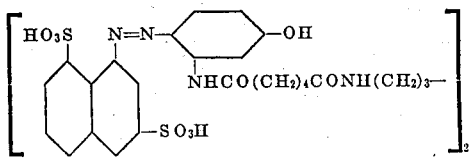

*Example VII*

A mixture of 26.5 parts of methyl N-meta-hydroxyphenyladipamate and 4.4 parts of 95% tetramethylenediamine is heated under a reflux condenser at 150° C. for 12 hours. The product is a white solid which, when extracted with hot ethyl alcohol and crystallized from dilute dimethylformamide, forms tiny colorless needles melting at 210–212° C.; weight 22.5 parts. Calculated for $C_{28}H_{38}N_4O_6$: N, 10.65%. Found: N, 11.09%. When this product is dissolved in 10% sodium carbonate and mixed with a solution of p-aminodiethylaniline and the mixture then treated with potassium ferricyanide, there is obtained an intense blue dye. The indoaniline thus formed has the following probable structure:

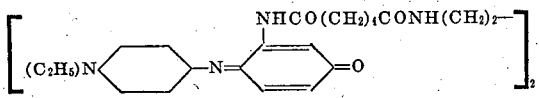

Five and two-tenths parts of this coupling component can be used as in Examples V and VI to form dyes identical in appearance with the dyes described in those examples.

*Example VIII*

A solution containing 3 parts of diazotized p-nitro-aniline is added to a solution of 5.3 parts of the coupling component of Example VII dissolved in 150 parts of 10% sodium hydroxide. The product is precipitated as a deep red sodium salt which has a metallic luster. Water solutions of the sodium salt dye silk a magenta color which, when washed in dilute acids, becomes lemon yellow. This dye is fast to washing and has the following probable structure:

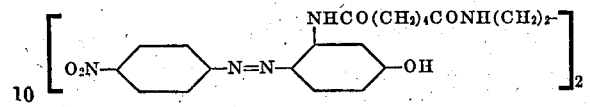

*Example IX*

Using a procedure identical with Example VII, 8.6 parts of decamethylenediamine was substituted for the tetramethylenediamine. The product was white, amorphous, and melted at 141–142° C. Calculated for $C_{34}H_{50}N_4O_6$: N, 9.17%. Found: N, 9.21%. This compound has dye-forming properties similar to those of the compounds in Examples I, IV and VII, giving orange-yellow azo and blue indoaniline dyes and has the following structure:

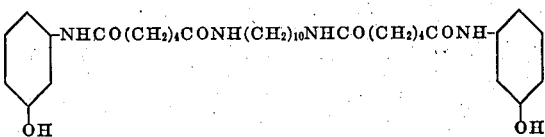

*Example X*

A mixture of 34.7 parts of methyl N-meta-(3-methyl-5-keto-1-pyrazyl)phenyladipamate (prepared as in Hanford, Kirby and Woodward, copending application Serial No. 301,070 of even date) and 5.8 parts of hexamethylenediamine is heated under nitrogen to 200° C. The temperature is then allowed to drop to 150° C. during ten minutes and held with stirring at 150–160° C. for 20 minutes. The product, a red resin, is ground with ethanol in a mortar until it flocculates, washed with water, and extracted twice with boiling ethanol. The insoluble residue is a light yellow powder, weighing 6.6 parts M. P. 203–206° C. Calculated for $C_{38}H_{50}N_8O_6$: N, 15.65%. Found: N, 14.15%.

Twenty-five parts of the above crude resinous material is dissolved in 200 parts of 5% sodium carbonate solution, then placed in a collodion membrane which is suspended in 5 successive portions of 10% sodium carbonate for 2 hours and then in water for 12 hours. The volume is adjusted to 500 parts and 300 parts of ethyl alcohol added. Then an excess of acetic acid is added, followed by ice and water to bring the volume up to 1500 parts. A pale yellow, semicrystalline solid precipitates which is washed and dried, M. P. 195–210° C. This material is readily soluble in 5% sodium carbonate solution, and has the following structure:

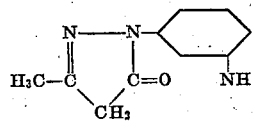 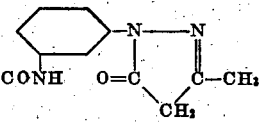

When a sodium carbonate solution of this coupling component is added to a solution of p-aminodiethylaniline and treated with potassium ferricyanide a deep magenta azomethine dye is formed.

Example XI

Two parts of the coupling component of Example X is dissolved in 30 parts of water containing 0.5 part of sodium carbonate. This solution is added to 100 parts of photographic gelatino-silver halide emulsion containing 12 per cent of solids. The emulsion is coated on cellulose acetate film base, exposed, and developed in a p-aminodiethylaniline developer. After removal of the silver and silver salts a brilliant magenta dye image remains. This has the following probable structure:

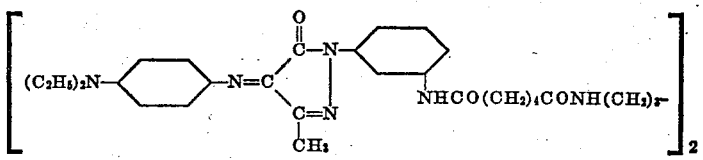

Multilayer films may be made according to the methods known to the art using a plurality of layers containing appropriate dye-forming nuclei linked with polyamide chains according to the present invention.

Example XII

A solution of 4.4 parts of diazotized p-nitroaniline-o-sulfonic acid is added to a solution of 7.2 parts of the coupling component of Example X, dissolved in 100 cc. of 5% sodium carbonate solution at 25° C. After one half hour the solution is neutralized and the yellow azo dye separated. This dye is soluble in alkaline solutions and dyes fabrics such as cotton, wool, and silk in fast shades of yellow. It has the following probable structure:

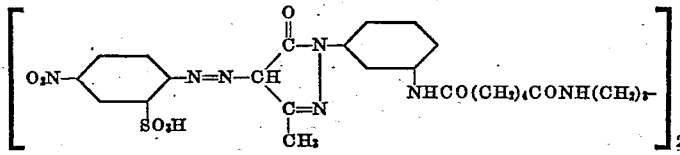

Example XIII

A mixture of 20 parts of methyl N-meta-(3-methyl-5-keto-1-pyrazyl)phenyladipamate and 4.95 parts of decamethylenediamine is heated at 160° C. for 15 hours. The resulting red solid is ground with methanol 3 times at room temperature. The insoluble residue is a pale yellow powder, weight 18.5 parts (83.5% yield) M. P. 167-174° C. Calculated for $C_{42}H_{58}N_8O_6$: N, 14.55%. Found: N, 13.94%. The substance is soluble in sodium carbonate solutions and may be used in place of the coupling component of Example X to form dyes of similar shade.

Example XIV

The procedure used in Example XIII is followed, two and two tenths parts of tetramethylenediamine being substituted for the decamethylenediamine. The reaction product is purified by repeated extraction with ethanol at room temperature. The insoluble residue is a light-yellow powder, yield 52%. M. P. 210-214° C. Calculated for $C_{36}H_{44}N_8O_6$:N, 16.32%. Found:N, 15.81%. The substance is soluble in sodium carbonate solution and has color and dye forming characteristics similar to the corresponding compounds in Examples X and XIII.

Example XV

A mixture of 25 parts of methyl N-m-hydroxyphenyladipamate and 6.6 parts of gamma,gamma-diaminodipropyl ether is heated for 20 minutes at 200° C. under an atmosphere of nitrogen. The mixture is kept at this temperature for an additional hour while the pressure is reduced to 2 mm. On cooling a pale amber resin is formed which is difficult to crystallize. Under anhydrous conditions a small amount of this material is obtained in a crystalline state but on standing in the air it becomes sticky. The material is very soluble in alcohol-water mixtures and has the probable structure.

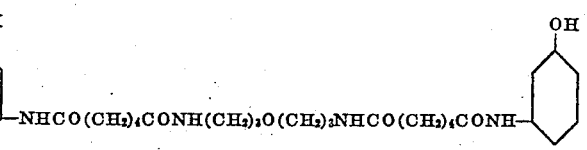

It is converted into a blue indoaniline dye by treatment with oxidized p-aminodiethylaniline or into an azo dye by treatment of its alkaline solution with a diazotized aromatic amine. The dyes formed are similar in shade to those produced from the coupling components of Example IV by the same procedure as in Examples V, VI, and VII.

Example XVI

A product similar to that produced in Example XV is prepared by substituting 7.4 parts of triglycoldiamine for the gamma,gamma-diaminodipropyl ether. This compound is completely soluble in water solutions as are dyes derived therefrom. These dyes may therefore be used to dye from neutral solutions.

Example XVII

A mixture of 35 parts of methyl N-para-phenylazo-phenyladipamate and 6 parts of hexamethylenediamine is heated at 220° C. for 20 minutes under an atmosphere of nitrogen. On cooling, a solid mass is obtained which is only sparingly soluble in most solvents but readily soluble in drying oils and can be used as a paint or rubber pigment. The material is an orange-yellow azo dye melting at 210-219° C. Calculated for $C_{42}H_{50}O_4N_8$:N, 15.34%. Found:N, 13.42%. This material is dissolved in boiling acetic acid and reduced with zinc dust. On dilution with water a solid material is precipitated from the reaction mixture which contains free amine groups and which has the following probable structure:

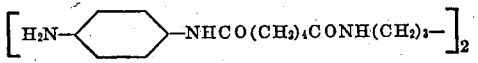

A solution of 37 parts of this diamine, 250 parts of 1 molar hydrochloric acid cooled to 5° C. and diazotized with 10 parts 10 molar sodium nitrite solution. This is then added to a solution of 45 parts of 2-naphthol-7-sulfonic acid and 50 parts of sodium carbonate in 200 parts of water. After stirring the reaction mixture held at 10° C. for one-half hour, this is neutralized with hydrochloric acid and 100 parts of sodium chloride are added. The orange dye is separated from the reaction mixture by filtration and dried. This product dyes wool in orange shades fast to washing and fulling and has the following probable structure:

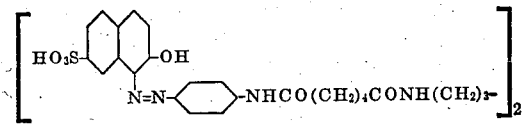

*Example XVIII*

Fifty-five parts of the diamino compound produced in Example XVII is dissolved in 250 parts of monochlorobenzene and 20 parts of ethyl acetoacetate is added. The solution is heated to boiling while being stirred over a period of about one hour and the alcohol formed in the reaction is allowed to escape. The mixture is then evaporated to one half its original value and is cooled. A solid reaction product separates which is soluble in aqueous sodium hydroxide solution and has the following probable structure:

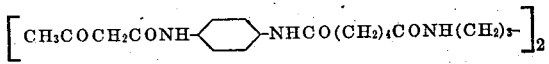

*Example XIX*

Six parts of the acetoacetanilide derivative of Example XVIII is dissolved in a mixture of 25 parts of ethyl alcohol and 75 parts of water containing 1.0 part of sodium hydroxide. This solution is added to 400 parts of a photographic gelatino-silver halide emulsion containing 12 parts per hundred of solids. The emulsion is coated on a cellulose acetate film base, exposed, and developed in a p-aminodiethyl aniline developer. After removal of the silver and silver salts, a bright yellow image remains.

*Example XX*

A mixture of 174 parts of dimethy adipate and 2320 parts of hexamethylenediamine is heated to 220° C. for 4 hours under nitrogen gas and the excess hexamethylenediamine removed by distillation under vacuum. The remaining material containing free amine groups has the following probable structure:

H₂N(CH₂)₆NHCO(CH₂)₄CONH(CH₂)₆NH₂

Neutral equivalent, calculated 171. Found 170.

To characterize this new diamine, the o-chlorobenzoyl derivative may be prepared by reaction with o-chlorobenzoyl chloride in the presence of sodium hydroxide solution. The compound, purified by recrystallization from ethyl alcohol, is white, in color, melting at 176-178° C. Calculated for chlorine: 11.47%. Found, 11.10%. The diamine is dissolved in pyridine and treated with a dioxane solution of salicyl chloride. On dilution of the reaction mixture with water, a solid product is obtained which is purified by recrystallization from alcohol. This compound has the following probable structure:

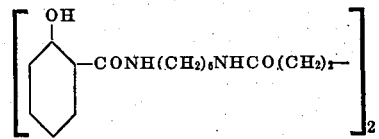

This product may be used in place of the compounds of Examples IV, VII and IX, in the preparation of dyes according to the procedures of Examples II, V, VI, and VII, and the dyes so produced are similar to the dyes described in those examples.

*Example XXI*

A mixture of 342 parts of the new diamine of Example XX and 3480 parts of dimethyl adipate is treated as is the mixture in Example I. The product is white, crystalline and melts at 178-180° C. It has the following probable structure:

H₃COOC(CH₂)₄CONH(CH₂)₆NHCO(CH₂)₄-
    CONH(CH₂)₆NHCO(CH₂)₄COOCH₃

Calculated for C₃₂H₅₈O₈N₄: N, 8.94%. Found: 8.61%.

Twenty parts of the new diamine of Example XX is dissolved in 100 parts of hot water and an equal volume of dioxane added. The mixture is stirred at 0° C. while 30 parts of monomethyl adipyl chloride and 12 parts of potassium hydroxide in 50 parts of water is added simultaneously. The product when crystallized twice from ethyl alcohol is white and melts at 185-186.5° C. This product was found to be identical with that prepared above. This compound when used in place of the diester of Example I produces coupling components of the type

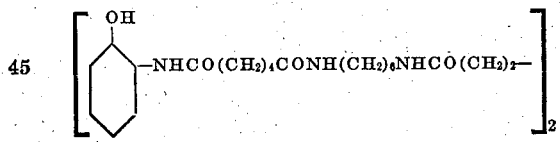

which have dye forming properties similar to the compound of Example I.

*Example XXII*

Fifteen parts of the dibasic acid of Example I and 90 parts of hexamethylenediamine is heated for 1 hour at 220° C. under an atmosphere of nitrogen. The excess hexamethylenediamine is removed by distillation in vacuum under the following conditions: bath temperature 160° C., distillation temperature 65° C., pressure 3 mm. The basic polymer is triturated with ether in order to remove the excess hexamethylenediamine. The yield is 90% of the theoretical. The dihydrochloride is prepared by dissolving the base in absolute alcohol and adding alcoholic hydrogen chloride. The white salt precipitates in a crystalline form and melts at 169-172° C. Calculated for chlorine: 11.08%. Found: 11.20%, 11.12%. Neutral equivalent: calculated 284; found 285 and 282. The product has the following probable structure:

H₂N(CH₂)₆NHCO(CH₂)₄CONH(CH₂)₆-
    NHCO(CH₂)₄CONH(CH₂)₆NH₂

This compound is dissolved in pyridine and treated with salicyl chloride as in Example XX. The resulting white solid product has the following probabe structure:

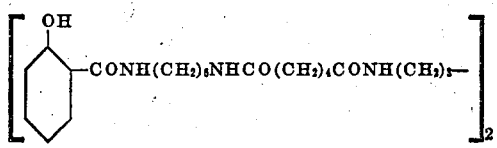

This compound has dye forming properties similar to the compound of Example XX.

*Example XXIII*

Six parts of the bis-m-aminophenol derivative of Example IV is dissolved in 60 parts of pyridine and 2.5 parts of chlorosulfonic acid is added. After stirring at 100° C. for 2 hours, the mixture is poured into an excess of warm dilute hydrochloric acid, cooled, and filtered. The precipitate is dissolved in 5% sodium carbonate solution, filtered hot, acidified, cooled, and filtered. The amorphous white product so obtained is soluble in aqueous sodium carbonate solution. This material contains about 90% of the calculated amount of sulfur for the monosulfonic acid.

Two parts of the sulfonic acid thus obtained is dissolved in 20 parts of 2% sodium carbonate and added to 100 parts of photographic gelatino-silver halide emulsion containing 12 parts per hundred of solids. This is then coated on a cellulose acetate film base, exposed, and developed in a p-aminodiethylaniline developer after which the silver and silver salts are removed in Farmer's reducer. A clear, bright, greenish-blue dye image remains in the film.

In place of the specific aromatic amino developing agents described in the preceding examples, there may be substituted various other specific agents of this type. These agents all have an unsubstituted amino group which enables the oxidation product to couple with the color-forming compound.

Such agents include nuclear substituted di- and tri-aminoaryl compounds in which one amino group is in the ortho or para position to another amino group, nuclear substituted mono- and di-aminoaryl compounds with a nuclear substituted hydroxyl group in the ortho or para position to an amino group, and suitable compounds formed therefrom by substitution in the second amino group where more than one is present as well as by substitution in the ring. Thus, halogen, alkyl, alkoxy and aryl groups may be present.

The preferred developing agents in the process of dye coupling development are derivatives of p-phenylenediamine and particularly the asymmetric dialkyl p-phenylenediamines, e. g., p-aminodimethylaniline, p-aminodiethylaniline, p-aminodibutylaniline, etc. Other developing agents which may be used include p-phenylenediamine itself, p-methylaminoaniline, p-ethylaminoaniline and p-aminophenol, N,N-diethyl-o-phenylenediamine, chloro-p-phenylenediamine, 1,2,5-toluylenediamine, 2-amino-5-diethylaminotoluene, N-p-aminophenylpiperidine, N-methyl-N-hydroxyethyl-p-phenylenediamine, N-butyl-N-hydroxyethyl-p-phenylenediamine, 2-amino-5-(N-butyl-N-hydroxyethylamino)toluene and its dihydrochloride, β-γ-dihydroxypropyl-p-phenylenediamine, etc. These aromatic amino-developing agents in the form of their organic or inorganic acid salts, may be used in preparing the developing solutions. The salts are in general more stable than the free bases. As examples of suitable salts mention is made of the hydrochloride, sulfates, acetates, etc.

The polyamide-linked coupling components of the present invention are defined generically as compounds having a plurality of nuclei of structure such that by reactions known to dye chemistry, they can be coupled or condensed with another component or components to form a dye, these dye nuclei being joined by means of a wholly aliphatic chain containing a plurality of amide groups and, within the chain, apart from the terminal groups, at least one amide group, desirably from the class of oxo amide groups and preferably carbonamido groups, —CONH—, these groups being derived from molecules of aliphatic bi-functional amide-forming derivatives preferably including bi-functional aliphatic carboxylic acids. The polyamide chains are preferably derived from dibasic, carboxylic or sulfonic acids wherein the carboxyl groups or sulfonyl groups are separated by at least two carbon atoms and diamines wherein the amino groups are similarly separated or from amino acids wherein the amino group is separated from the acid group by a chain of at least two carbons. The amido groups in the chain derived from either of the above classes are thus separated by a chain containing, in the chain, at least two carbons bearing hydrogen.

The preferred form of this invention is that wherein the polyamide chain is linear and contains at least 14 atoms and not more than 36 atoms and is made up of carbonamido groups, —CONH—, joined by divalent aliphatic radicals which are hydrocarbon. Such coupling components are in the range where they are non-migratory and yet have a sufficiently strong color-forming value.

One type of this preferred form of the invention is that wherein the dye-forming intermediate has the formula

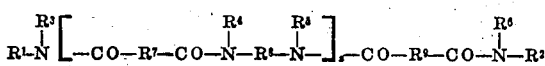

wherein $R^1$ and $R^2$ are groups, either the same or different, having dye coupling structures as set forth above, $R^3$, $R^4$, $R^5$ and $R^6$ are hydrogen or small alkyl groups either the same or different, $R^7$, $R^8$, $R^9$ are aliphatic bivalent radicals which may be straight chain, branched, cycloaliphatic, or may contain ether linkages. $R^7$, $R^8$, $R^9$ are preferably polymethylene in which case the compound has the formula

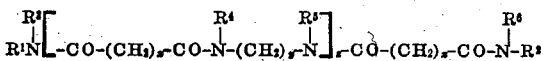

wherein $R^1$, $R^2$, $R^3$, $R^4$, $R^5$, and $R^6$ have the same value as before, $x$ is either zero or a positive integer, $y$ is an integer having a value of 2 or more, the sum of $x+y$ must be at least six and $z$ is an integer from 1 to 3, preferably 1. Any one or more of the amide linkages may be written in the reverse order, and one or more carbonyl (—CO—) groups may be replaced by the sulfonyl group (—SO$_2$—). Thus the compounds may have the formulae

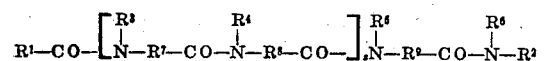

$z$ and the various R's having the values previously given them.

While a great number of possible structures can be written and all of these can be synthesized by the methods herein described, nevertheless the compounds are all of the class above defined and may be prepared by methods obvious in view of the art in connection with the disclosure of the present invention.

In the process of making the coupling components of the present invention there are several methods of making the compounds. In one method, a polyamide compound having two terminal amino groups having hydrogen on each terminal nitrogen is reacted with a suitable acidic compound having the dye coupling nuclei. This may be a carboxylic or sulfonic acid or ester or halide thereof and having the requisite amino, hydroxyl or etherified hydroxyl groups in the proper positions to direct dye coupling, an active methylene group, or the like.

In another method, the polyamide compound has two terminal carboxyls, ester, or acid halide groups and is reacted with a suitable dye coupling compound having a primary or secondary amino group not needed in the (later) dye coupling.

In a third method, the polyamide component has a terminal amino group having at least one hydrogen on the nitrogen and a terminal carboxylic ester group. This may be acylated on the amino group by the proper carboxylic or sulfonic acid or halide or ester thereof, having the proper dye coupling structure and the resulting compound is then amidated by treatment with an amine having the suitable dye coupling structure. The acylation and amidation steps above can, of course, be performed in the reverse order if the amino group of the polyamide component is first protected by acetylation.

In a fourth method, a polyamide-forming compound may be joined to a dye coupling nucleus at one end of the chain having at the other, e. g., a terminal amino group. This can be reacted, e. g., with a dicarboxylic acid derivative to join two molecules of the amino compound together by the residue of the dicarboxylic acid.

In a fifth method, a polyamide-forming component may be joined to a dye coupling nucleus at one end of the chain having at the other end a terminal amide-forming group, for example, a carboxyl group or ester group, etc. This polyamide-forming component can be reacted with a diamine to join two molecules of carboxyl compound together by the residue of the diamine.

In all cases where a dicarboxylic acid is used in the preparation of polyamide coupling components, it is possible to use either the alkyl ester, phenyl ester, or acid chloride unless otherwise specified. The conditions of the reaction vary depending on which of these derivatives is used. In general, when the free acid is used, a salt is first formed with the amine to be used in the condensation. This is then dried and heated at a temperature of 200–240° C. for 1 to 4 hours. When the carboxylic acid esters are used, the reactants are mixed in the proper proportions and heated to between 190° C. and 210° C. for one-half to two hours. In some cases, it is necessary to raise the initial temperature to as high as 250° C. to induce reaction (see Examples I, III, etc.) The phenyl esters are in general more easily condensed than the alkyl esters and may be used in cases where prolonged heating or high temperatures are undesirable. When the acid chlorides are used, the reaction may be run in an inert solvent such as ether, benzene, or dioxan, or in pyridine, quinoline, dimethylaniline or the like tertiary bases as solvents. The hydrogen chloride liberated is removed by solid caustic alkali, aqueous alkali, pyridine, or any other suitable organic tertiary amine (see Examples I, XX, XXII).

The preparation of short polyamide chains for condensation with coupling components as exemplified in Example I is capable of many modifications. This three-unit polyamide chain with terminal ester groups may be further condensed with a large excess of hexamethylenediamine to yield a five-unit chain with terminal amine groups (see Example XII). If, in place of the hexamethylenediamine, two equivalents of epsilon-aminocapronitrile is used and the chloride of the three-unit diester, a five-unit polyamide chain with terminal nitrile groups is produced. This compound may be reduced to form the same five-unit compound as above or it may be hydrolyzed to yield a five-unit chain with terminal acid groups. Thus the two following types of compounds can be prepared:

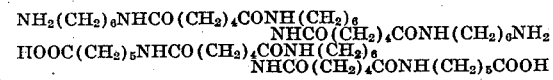

A short polyamide chain with a central dibasic acid nucleus can equally well be prepared from a dibasic acid and an excess of a diamine (see Example XX). Such a three-unit chain has terminal amine groups and can be used directly or increased to a five-unit chain by reaction with an excess of dimethyl adipate (see Example XXI).

Several bifunctional compounds in which the functional groups are not the same can be used in the synthesis of these polyamide chains. These include the acid chlorides of dibasic acid mono-esters, amino nitriles, and cyano acids. By use of such compounds it is not necessary to use a large excess of the reactants. Thus, the diesters of the three-unit chains of Example I can be produced by reaction by two equivalents of a half acid chloride of a dicarboxylic acid ester and a diamine. Two equivalents of a cyano acid chloride can be used in this reaction. The product containing terminal nitrile groups can be either reduced or hydrolyzed to form amine or acid groups. Similarly two equivalents of an amino nitrile can be condensed with a dibasic acid chloride and the product reduced to form the same type of compound as in Example XX or it may be hydrolyzed to form terminal carboxyl groups, the structure then being

$x$ and $y$ being integers.

By the above methods it is possible to prepare three-unit chains with central diamine or diacid residues and containing either terminal amine or carboxyl groups. In the same way, symmetrical five-unit chains of any desired structure may be prepared. Any of the above polyamide chains may be condensed with suitable members of the following groups, RNH₂, RSH, RCOOH, RCOO alkyl, RCOO aryl, RCOCl, RSO₂Cl, where R is a coupling component nucleus as previously described.

In the stepwise synthesis of polyamide coupling components, there are further possibilities of variation by using acid chlorides of dicarboxylic acid monoesters, by using amino nitriles, and by using cyano carboxylic acid chlorides. The ester-acid chloride or cyano-acid chloride may be used on compounds containing free amine groups where mono substitution is desired. The reaction is carried out under conditions as stated above for removal of the liberated hydrogen chloride. See Examples I and XII and copending application of Hanford, Kirby and Woodward of even date. Aminonitriles may be condensed with any compound containing free acid, ester, or acid chloride groups where mono substitution is desired. The nitrile group (—CN) in any of the products may be either reduced to an amine group by hydrogenation with elementary hydrogen using liquid ammonia as the reaction medium and nickel catalyst or hydrolyzed to the carboxylic acid by boiling in water, acidified with sulfuric acid, or may be converted to the methyl ester by boiling in methanol containing sulfuric acid. Thus polyamide coupling components of any desired structure may be formed by proper choice of reactants, reactions, and number of steps. These monofunctional compounds containing one dye coupling nucleus and one free acid or amine group may be condensed with an aliphatic difunctional compound or with a short polyamide chain of the type described above and according to the methods described above. Such polyamide coupling component will have (N+2) acylamino groups where N is the number of such groups in the reactants.

Polyamide coupling components containing free acid groups are desirable products as many of them are soluble in sodium carbonate solution or in water and still possess the non-migratory characteristics of the previously described polyamide coupling components. A number of methods are available for producing such compounds, e. g., the coupling component nucleus used may either possess a sulfonic acid group before condensation or a sulfonic acid group (see Example XXIII) or a carboxyl group may be introduced into the final product by any suitable method described in textbooks on organic chemistry.

The use of long aliphatic polyamide chains in dye chemistry and color photography makes the intermediate and dyes insoluble when included in photographic emulsions, when dyed on fabrics, or intimately mixed with plastic and thermoplastic materials. The coupling components of this invention have the further advantage that because of the multiplicity of amide groups they have an increased affinity for organic materials containing peptide linkages such as wool, silk, gelatin, and albumin. The introduction of sulfonic acid groups into the compound increases the water solubility, dispersibility, and affinity for wool and cotton.

Polyamide dye coupling components are extremely well adapted for use in color photography. Their amide groups make them compatible with polypeptide colloids such as gelatin and when they are dispersed in photographic emulsions and coated on suitable supports they exhibit great resistance to washing out in any of the photographic processing baths commonly used. All such polyamide coupling components with reactive coupling positions or coupling positions occupied by readily replaceable groups such as halogen, carboxyl, or sulfonic acid yield indophenol, indoaniline, indamine, and azomethine dyes in the presence of the oxidation products of the aromatic amino photographic developers exemplified by paraphenylenediamine, para-aminophenol, and suitable derivatives thereof. Thus colored photographs of the type described in U. S. Patent 1,055,155 may be prepared or the coupling components may be used in any other suitable color photography process.

The azo dyes produced from these coupling components containing sulfonic acid groups are water soluble and particularly desirable for dyeing fabrics such as wool. These azo dyes are also especially adaptable for conversion by heavy metal salts to water insoluble pigments which may be used for paints, inks, or rubber colors. These polyamide dye coupling components are also well suited for incorporation in such artificial fibers and films as regenerated cellulose, cellulose acetate, or any of the linear polymers. The azo dye may then be developed on the fiber or film by treatment with a solution of a diazotized amine or any of the stabilized azo amino compounds used in dye printing.

In the prior art a method for producing good colored photographs has been found, but practical difficulties arising from the failure to obtain completely non-migratory and easily dispersible intermediates have retarded its development.

This invention is of advantage, inter alia, in that it affords dye coupling components which have special advantages over the previously described compounds. With a coupling component nucleus on each end of the aliphatic chain, there is less color dilution than in compounds containing alkyl chains substituted on only one end, and hence the tinctorial value is much greater.

The polyamide coupling components containing less than 14 atoms in the chain, and also those containing ether groups in the chain, while not highly suitable for incorporation in photographic emulsions, nevertheless are desirable compounds for preparing azo dyes for wool and cotton and are valuable components for use in photographic color developing solutions of the type described in U. S. Patents 1,102,028 and 2,113,329. The preferred coupling components as described above and the dyes produced from them show a complete resistance to leaching from or migration in photographic films during washing or processing. Azo dyes produced from these coupling components, especially those containing sulfonic acid groups, are especially suitable for dyeing wool and show great resistance to washing and fulling. Pigments made from these azo dyes are extremely insoluble in water and may be used in rubber paints and printing inks. Further these coupling components and the dyes manufactured from them when dyed on the fabric impart to some extent a waterproofing effect.

The above description and examples are intended to be illustrative only. Any modification of or variation therefrom which conforms to the spirit of the invention is intended to be included within the scope of the claims.

What is claimed is:

1. A dye intermediate containing two monovalent nuclei capable of reacting to form a dye and of the formula X—Ar—, wherein X is joined to a nuclear aromatic carbon of the —Ar— radical and is selected from the group consisting of the hydroxyl and amino groups and —Ar— is a bivalent aromatic radical having a readily replaceable radical of the class consisting of hydrogen, halogen, sulfo, and carboxyl or nuclear aromatic carbon separated from X by an even number, from 2 to 4, of nuclear aromatic carbon atoms, said nuclei being joined by a saturated, wholly aliphatic synthetic chain having terminal amide linkages and, within the chain and apart from the terminal amide linkages, at least one amide linkage said amide linkages being joined by bivalent aliphatic hydrocarbon radicals.

2. A dye intermediate containing two monovalent nuclei capable of reacting to form a dye, of the formula X—Ar—, wherein X is joined to a nuclear aromatic carbon of the —Ar— radical and is selected from the group consisting of the hydroxyl and amino groups and —Ar— is a bivalent aromatic radical having a readily replaceable radical of the class consisting of hydrogen, halogen, sulfo, and carboxyl on nuclear aromatic carbon separated from X by an even number, from 2 to 4, of nuclear aromatic carbon atoms, said nuclei being joined through terminal amide linkages of the class consisting of carboamide —NHCO— and sulfonamido —NHSO$_2$— by means of a saturated aliphatic synthetic chain containing within the chain at least one amide linkage of this class, apart from the terminal amide linkage said amide linkages being joined by bivalent aliphatic hydrocarbon radicals.

3. A dye intermediate containing two monovalent nuclei capable of reacting to form a dye, of the formula X—Ar—, wherein X is joined to a nuclear aromatic carbon of the —Ar— radical and is selected from the group consisting of the hydroxyl and amino groups and —Ar— is a mononuclear bivalent aromatic radical having a readily replaceable radical of the class consisting of hydrogen, halogen, sulfo and carboxyl on nuclear aromatic carbon separated from X by an even number, from 2 to 4, of nuclear aromatic carbon atoms, said nuclei being joined through terminal amide linkages of the class consisting of carbonamido —NHCO— and sulfonamido —NHSO$_2$— by means of a saturated aliphatic synthetic chain containing within the chain at least one amide linkage of this class, apart from the terminal amide linkage, the amide linkages being separated by hydrocarbon chains of at least two carbon atoms attached to hydrogen.

4. A dye intermediate containing two nuclei capable of reacting to form a dye by means of the diazo reaction and of the formula X—Ar—, wherein X is joined to a nuclear aromatic carbon of the —Ar— radical and is selected from the group consisting of the hydroxyl and amino groups and —Ar— is a bivalent aromatic radical having a readily replaceable radical of the class consisting of hydrogen, halogen, sulfo, and carboxyl on nuclear aromatic carbon separated from X by an even number, from 2 to 4, of nuclear aromatic carbon atoms, said nuclei being joined together by means of a saturated wholly aliphatic synthetic chain having terminal carbonamide linkages and, within the chain, at least one carbonamide linkage apart from the terminal linkage said amide linkages being joined by bivalent aliphatic hydrocarbon radicals.

5. A dye intermediate containing two nuclei capable of coupling with aromatic diazo compounds and of the formula X—Ar—, wherein X is joined to a nuclear aromatic carbon of the —Ar— radical and is selected from the group consisting of the hydroxyl and amino groups and —Ar— is a mononuclear bivalent aromatic radical having a readily replaceable radical of the class consisting of hydrogen, halogen, sulfo, and carboxyl on nuclear aromatic carbon separated from X by an even number, from 2 to 4, of nuclear aromatic carbon atoms, said nuclei being joined together by means of a saturated wholly aliphatic synthetic chain having terminal carbonamide linkages and, within the chain, at least one carbonamide linkage apart from the terminal linkage said amide linkages being joined by bivalent aliphatic hydrocarbon radicals.

6. A dye intermediate containing two monovalent nuclei capable of reacting to form a dye by diazotization and coupling with an azo dye coupling component, said nuclei being of the formula H$_2$N—Ar— in which the —NH$_2$ group is on nuclear aromatic carbon and —Ar— is a mononuclear bivalent aromatic radical, said nuclei being joined together by means of a saturated wholly aliphatic synthetic chain having terminal carbonamide linkages and, within the chain, at least one carbonamide linkage apart from the terminal linkage said amide linkages being joined by bivalent aliphatic hydrocarbon radicals.

7. A dye intermediate containing two nuclei capable of reacting to form a dye by means of the diazo reaction, said nuclei having the formula X—Ar—, wherein X is joined to a nuclear aromatic carbon of the —Ar— radical and is selected from the group consisting of the hydroxyl and amino groups and —Ar— is a bivalent aromatic radical having a readily replaceable radical of the class consisting of hydrogen, halogen, sulfo, and carboxyl on nuclear aromatic carbon separated from X by an even number, from 2 to 4, of nuclear aromatic carbon atoms, said nuclei being joined by means of a saturated wholly aliphatic synthetic chain of at least fourteen and not more than thirty-six carbon atoms, having terminal carbonamide linkages and, within the chain, at least one carbonamide linkage apart from the terminal carbonamide linkages said amide linkages being joined by bivalent aliphatic hydrocarbon radicals.

8. A dye intermediate containing two nuclei capable of coupling with aromatic diazo compounds, said nuclei being of the formula X—Ar—, wherein X is joined to a nuclear aromatic carbon of the —Ar— radical and is selected from the group consisting of the hydroxyl and amino groups and —Ar— is a mononuclear bivalent aromatic radical having a readily replaceable radical of the class consisting of hydrogen, halogen, sulfo, and carboxyl on nuclear aromatic carbon separated from X by an even number, from 2 to 4, of nuclear aromatic carbon atoms, said nuclei being joined by means of a saturated wholly aliphatic synthetic chain of at least fourteen and not more than thirty-six carbon atoms, having terminal carbonamide linkages and, within the chain, at least one carbonamide linkage apart from the terminal carbonamide linkages said amide linkages being joined by bivalent aliphatic hydrocarbon radicals.

9. A dye intermediate containing two nuclei capable of reacting to form a dye by diazotization and coupling with an azo dye coupling component, said nuclei being of the formula H$_2$N—Ar—, wherein the H$_2$N— group is on nuclear aromatic carbon and —Ar— is a bivalent aromatic radical, said nuclei being joined together by means of a saturated wholly aliphatic synthetic polyamide chain of at least fourteen and not more than thirty-six carbon atoms, having terminal carbonamide linkages and, within the chain, at least one carbonamide linkage apart from the terminal carbonamide linkages said amide linkages being joined by bivalent aliphatic hydrocarbon radicals.

10. A dye intermediate of the formula

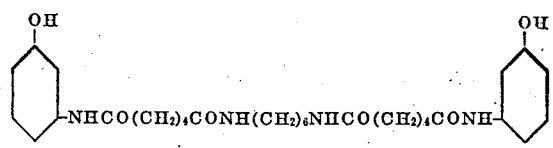

11. A dye intermediate of the formula
  
NHCO(CH$_2$)$_4$CONH(CH$_2$)$_6$NHCO(CH$_2$)$_4$CONH
12. A dye intermediate of the formula
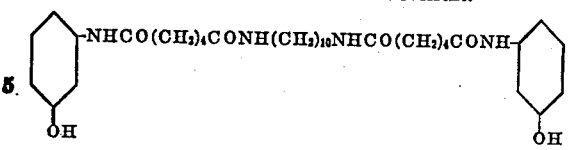
JAMES EMORY KIRBY.

CERTIFICATE OF CORRECTION.

Patent No. 2,330,291. September 28, 1943.

JAMES EMORY KIRBY.

It is hereby certified that error appears in the printed specification of the above numbered patent requiring correction as follows: Page 2, second column, line 72, for the word "products" read --product--; page 5, first column, line 7, after "acid" insert --is--; page 6, first column, line 2, for "probabe" read --probable--; page 7, second column, line 12, for "XII" read --XXII--; line 40, for "by" before "two" read --of--; and that the said Letters Patent should be read with this correction therein that the same may conform to the record of the case in the Patent Office.

Signed and sealed this 30th day of November, A. D. 1943.

(Seal)

Henry Van Arsdale,
Acting Commissioner of Patents.